Patented Nov. 26, 1946

2,411,815

UNITED STATES PATENT OFFICE 2,411,815

SOLUTIONS OF ORGANIC MERCURY COMPOUNDS

Frank J. Sowa, Cranford, N. J.

No Drawing. Application May 31, 1943,
Serial No. 489,244

5 Claims. (Cl. 167—30)

This invention relates to solutions of organic mercury compounds and to methods for producing and using such solutions.

It is well known that the aryl and aralkyl mercury hydroxides and salts are relatively insoluble in water. Thus, for example, phenyl mercuric acetate is soluble in water to the extent of about 1 part in 600 parts of water while phenyl mercuric chloride only dissolves to the extent of about 1 part to 20,000 parts of water. All known compounds having the general formula R—Hg—X, wherein R is an aryl, aralkyl, alkaryl, or heterocyclic group, Hg is mercury, and X is an anion, exhibit similar low solubility in water and in many water miscible solvents such as alcohols, glycerols and the like.

Many, if not all, of these organic mercury compounds have high toxicity to bacteria and fungi and have other important uses in industry and medicine. However, because of their relatively low solubility it is not economically practical to ship the product in the form of a solution and it frequently is difficult or impossible for the user to produce solutions having the desired concentration of the mercury compound therein. Moreover, in many applications of such solutions it is impossible to use sufficient water or solvent for the mercury compound to obtain the required concentration thereof in the product without undesired dilution or unbalancing of a formula.

I have discovered that the solubility of mercury compounds of the R—Hg—X type, in water and in mixtures of water with solvents such as alcohols, glycerols and the like, can be materially increased provided ammonium hydroxide and a soluble ammonium salt are present in the solution. Some of the ammonium salts may be used for this purpose without adding ammonium hydroxide to the solution, whereas in at least one instance I have found it possible to dissolve a relatively water insoluble organic mercury compound in a solution of ammonium hydroxide alone. However, in most instances it is necessary to use both ammonium hydroxide and an ammonium salt in order to dissolve substantial amounts of the mercury compounds in aqueous solutions. It is also found in general that the pH value of the solution should be above 7 and preferably in the range of about 7.2 to 9.0.

Solutions of this character may contain up to 50% or more by weight of the aryl, aralkyl or alkaryl mercury compound and can be used to apply such compounds to fabrics, leather, paper, sheets or films, or for admixture with paints or latex solutions, and they may be added to dispersions and emulsions of water proofing or fabric treating compositions. They also may be used in carrying out various chemical reactions wherein high concentrations of mercury compounds are desirable or of advantage. The solutions may be caused to penetrate into fibers, or pores in material or they may be applied as a constituent of film forming, coating or impregnating compositions. Furthermore, the concentration of organic mercury compounds in medicinal and industrial formulae may be materially increased by practice in accordance with the present invention.

The principal objects of the present invention are to increase the solubility or concentration of organic mercury compounds in aqueous solutions; to provide new types of mercury containing germicidal compositions and products; to increase the resistance of products to the action of bacteria, fungi, mildew and the like; and to provide novel methods of producing and using solutions of organic mercury compounds having the general formula R—Hg—X, in which R is an aryl, aralkyl, alkaryl or heterocyclic group, Hg is mercury and X is an anion.

Particular objects of the invention are to provide relatively concentrated solutions of phenyl mercury compounds and to provide methods for using such solutions in the treatment of fabrics, leather and other fibrous, porous or textile products to render them bacteriostatic, fungistatic and mildew resistant.

These and other objects and features of the present invention will appear from the following description thereof in which specific examples are cited to indicate the nature of the invention and typical applications and embodiments thereof, but without intending to limit the scope of the invention thereby.

My investigations indicate that all of the organic mercury compounds which have the general formula R—Hg—X will dissolve to a greater extent in aqueous solutions containing an ammonium compound than they will in water or the solvent alone. It appears in most instances that the solubility of the mercury compound in aqueous solvents is markedly increased when the solution also contains both an ammonium salt and ammonium hydroxide. I am unable at this time to state exactly what chemical or physical reactions account for the increase in solubility of the mercury compound in aqueous solutions when ammonium compounds are present, but it is my belief that some addition compound or coordination complex is produced during solution, and that the resulting compound or complex is itself relatively soluble or exerts an influence on the mercury compound which serves to increase its solubility in water.

Among the ammonium salts I have used to increase the solubility of phenyl mercuric acetate in water, I may mention specifically ammonium sulphate, ammonium carbonate, tri-ammonium phosphate, di-ammonium phosphate, ammonium borate, ammonium tetraborate, ammonium citrate, ammonium oxalate, ammonium lactate, ammonium formate and ammonium acetate. A 5% solution of any one of these salts has been found to be capable of dissolving from 4 to 12% of phenyl mercuric acetate provided some ammonium hydroxide is also present in the solution and preferably is added in sufficient quantities to give a final solution having a pH value above 7 and preferably in the range of from about 7.2 to 9.0. Of these salts it has been found that ammonium carbonate, di-ammonium phosphate, tri-ammonium phosphate and ammonium borate are capable of use by themselves in increasing the solubility of phenyl mercuric acetate. No ammonium hydroxide need be added when using these salts.

Other compounds having the general formula R—Hg—X exhibit the same property of increased solubility in water containing ammonium compounds. Thus, phenyl mercuric hydroxide, phenyl mercuric borate, phenyl mercuric phthalate, phenyl mercuric gluconate, benzyl mercuric acetate and pyridyl mercuric acetate are soluble to a greater extent in aqueous solutions of ammonium salts containing ammonium hydroxide, than they are in water alone.

Phenyl mercuric hydroxide is soluble in solutions of ammonium acetate or ammonium sulphate alone but this probably is due to a reaction of the hydroxide with the acetate or sulphate to produce some ammonium hydroxide in the solution. I have also discovered that phenyl mercuric gluconate is soluble in ammonium hydroxide alone. Solutions containing 75 grams of phenyl mercuric gluconate in 100 cc. of water are obtained by simply adding enough ammonium hydroxide to keep the pH value around 8. Similarly, 20 grams of phenyl mercuric hydroxide may be dissolved in 100 cc. of water containing 40 grams of ammonium gluconate and having a pH value of approximately 9.

The amount of the ammonium salt used appears to influence the solubility of the mercury compound and solutions containing from 1 to 20% of ammonium sulphate indicate that the maximum solubility of the mercury compound in such solutions is possible when about 4% of ammonium sulphate is used.

In producing solutions in accordance with my invention it is of course desirable to choose ammonium salts which will not react with the mercury compound to produce a more insoluble mercury compound. Thus, when endeavoring to increase the solubility of phenyl mercuric acetate, if ammonium chloride is used the relatively less soluble phenyl mercuric chloride will be produced and may even precipitate from the solution. Similarly, if ammonium thiocyanate is used the almost completely insoluble phenyl mercuric thiocyanate will precipitate. While these less soluble compounds are themselves dissolved to some extent in the ammoniacal ammonium salt solution, although almost completely insoluble in water, they are not soluble to the same extent as the acetate so that the apparent result when using ammonium chloride and ammonium thiocyanate or similar compounds, is to decrease the amount of the phenyl mercuric acetate in solution. Such reactions, however, are to be avoided in the practice of my invention and ammonium salts selected which will not react with the mercury compound to produce a less soluble mercury compound.

In choosing an ammonium salt to increase the solubility of ammonium compounds of the R—Hg—X type it also appears that the action of ammonium salts of nitrogen containing acids are much less effective than are other salts. Thus the increase in solubility of phenyl mercuric acetate in an ammoniacal solution of ammonium nitrate is less than might have been expected. Similarly, the action of a few other ammonium salts is limited and relatively poor or negligible results are obtained when using ammonium fluoride, ammonium fluo-silicate, ammonium chloride and ammonium linolate. Nevertheless, the great majority of the ammonium salts appear to increase the solubility of the mercury compounds enormously and even the less active salts mentioned above appear to have some influence on the solubility of the R—Hg—X type of compounds.

In order to indicate typical and preferred solutions using ammonium salts in ammoniacal water solutions, having a pH valve above 7 the following examples are cited.

| 100 cc. of 5% salt solution: | Grams of phenyl mercuric acetate dissolved |
|---|---|
| $(NH_4)_2SO_4$ | 8–12 |
| $NH_4H_2PO_4$ | 6–8 |
| $(NH_4)_2HPO_4$ | 6–8 |
| $(NH_4)_3PO_4$ | 6–8 |
| $NH_4HCO_3$ | 4–6 |
| $(NH_4)_3BO_3$ | 6–8 |
| $(NH_4)HB_4O_7$ | 8–10 |
| Ammonium oxalate | 7–9 |
| Ammonium citrate | 6–8 |
| Ammonium lactate | 8–12 |
| Ammonium formate | 6–7 |
| Ammonium acetate | 6–8 |

Alcoholic solutions and mixtures of water with other water miscible solvents such as triethanol amine also exhibit the same ability to dissolve increased amounts of organic mercury compounds of the R—Hg—X type provided an ammonium compound is present. Thus, for example, when forming solutions of phenyl mercuric acetate in water and triethanol amine in accordance with the process of my copending application Serial No. 443,304, filed May 16, 1942, it is sometimes difficult to produce solutions of the desired concentration. The addition of ammonium sulphate and ammonium hydroxide to such solutions overcomes this difficulty and not only increases the amount of the mercury compound which may be dissolved but greatly speeds up solution and results in the formation of solutions which are clear and very stable.

Solutions produced in accordance with the present invention may be applied directly or after dilution with water, to fabrics, leather, paper or the like by spraying the solution thereon or by dipping or immersing material therein and the solution may be applied under pressure to insure the desired penetration of the solution into the pores or fibers of the articles being treated. They also may be added to textile treating baths or finishes such as alkaline solutions of cellulose ethers, suspensions of waxes, resins or other similar materials. The ammoniacal or alkaline nature of solutions embodying my invention renders them particularly suitable for admixture with latex dispersions, and suspension of rubber, colloids, waterproofing or fireproofing agents, or products such as casein paints and aqueous coating and impregnating compositions.

Products thus treated are rendered bacteriostatic, fungistatic, mildew resistant and germicidal by reason of the mercury compound deposited on or in the product or admixed therewith. The amount of the solution used in any particular application will vary considerably but when employed to treat textile fabrics the weight of the mercury compound in the treated material should generally equal about 0.02 to 1.0% and preferably about 0.5% of the weight of the fabric.

While I have suggested numerous compositions and uses for solutions produced in accordance with the present invention it will be understood that many other uses and formulae will suggest themselves to those skilled in the art and be apparent from the foregoing description of the invention. In view thereof it is intended that the particular composition and uses of solutions specifically described above be considered as illustrative only since the scope of my invention is defined by the following claims.

I claim:

1. A solution of a phenyl mercury compound in an aqueous solvent containing from about 1 to 20 parts by weight of a salt selected from the group consisting of ammonium sulfate, ammonium carbonate, tri-ammonium phosphate, di-ammonium phosphate, mono-ammonium phosphate, ammonium borate, ammonium tetra-borate, ammonium citrate, ammonium oxalate, ammonium lactate, ammonium formate, ammonium acetate, and ammonium gluconate, together with sufficient ammonium hydroxide to maintain the pH value of the solution above 7, the amount of the phenyl mercury compound in solution exceeding the amount soluble in the aqueous solvent of the solution.

2. A solution containing phenyl mercury acetate dissolved in an aqueous solvent containing an ammonium salt selected from the group consisting of ammonium sulfate, ammonium carbonate, tri-ammonium phosphate, di-ammonium phosphate, mono-ammonium phosphate, ammonium borate, ammonium tetra-borate, ammonium citrate, ammonium oxalate, ammonium lactate, ammonium formate, ammonium acetate, and ammonium gluconate, together with sufficient ammonium hydroxide to maintain the pH value of the solution above 7, the amount of the phenyl mercury acetate in solution exceeding the amount soluble in the aqueous solvent of the solution.

3. An aqueous solution having a pH value not less than 7 and containing a phenyl mercury compound, triethanolamine, ammonium hydroxide and ammonium sulfate, the amount of the phenyl mercury compound in solution being in excess of that soluble in the water of the solution.

4. An aqueous solution having a pH value not less than 7 and containing phenyl mercury acetate, triethanolamine, ammonium hydroxide and ammonium sulfate, the amount of the phenyl mercury compound in solution being in excess of that soluble in the water of the solution.

5. A method of increasing the stability of an aqueous solution containing phenyl mercury acetate and triethanolamine which comprises the step of adding ammonium hydroxide and ammonium sulfate thereto.

FRANK J. SOWA.